US008291005B2

(12) United States Patent
Lang et al.

(10) Patent No.: US 8,291,005 B2
(45) Date of Patent: Oct. 16, 2012

(54) PROVIDING CONSISTENCY IN PROCESSING DATA STREAMS

(75) Inventors: Christian Alexander Lang, New York, NY (US); George Andrei Mihaila, Yorktown Heights, NY (US); Ioana Roxana Stanoi, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1319 days.

(21) Appl. No.: 11/970,309

(22) Filed: Jan. 7, 2008

(65) Prior Publication Data
US 2009/0178059 A1 Jul. 9, 2009

(51) Int. Cl.
*G06F 15/16* (2006.01)
*G06F 17/00* (2006.01)

(52) U.S. Cl. .................... 709/201; 709/231; 707/690

(58) Field of Classification Search .......... 709/201–202, 709/216–219, 231; 707/690, 718–719
See application file for complete search history.

(56) References Cited

U.S. PATENT DOCUMENTS

| 7,383,253 | B1* | 6/2008 | Tsimelzon et al. | 707/610 |
| 7,437,521 | B1* | 10/2008 | Scott et al. | 711/151 |
| 2003/0131027 | A1* | 7/2003 | Holenstein et al. | 707/201 |
| 2007/0110027 | A1* | 5/2007 | Yeh et al. | 370/351 |
| 2008/0109496 | A1* | 5/2008 | Holenstein et al. | 707/204 |
| 2009/0125550 | A1* | 5/2009 | Barga et al. | 707/104.1 |

OTHER PUBLICATIONS

Agrawal et al., "Efficient View Maintenance at Data Warehouses", ACM SIGMOND Record, vol. 26, Issue 2, Jun. 1997, pp. 417-427.
Barga et al., "Consistent Streaming Through Time: A Vision for Event Stream Processing", 3rd Biennial Conference on Innovative Data Systems Research, Jan. 2007, Asilomar California, pp. 363-374.
Huyn, "Multiple-View Self-Maintenance in Data Warehousing Environments", Procedings of the 23rd VLDB Conference, Athens, Greece, 1997, pp. 1-12.
Li et al., "Safety Guarantee of Continuous Join Queries over Punctuated Data Streams", VLDB Conference, Sep. 2006, Seoul, Korea, pp. 19-30.

* cited by examiner

*Primary Examiner* — Yasin Barqadle
(74) *Attorney, Agent, or Firm* — Yee & Associates, P.C.; Preston Young

(57) ABSTRACT

Providing consistency guarantees in a data stream processing engine is provided. Consistency tracking information is attached to data streams coming into the data stream processing engine. The consistency tracking information is propagated through a plurality of streaming operators that process the data streams within the data stream processing engine. Then, the propagated consistency tracking information is used to detect a consistent state in an output stream.

20 Claims, 11 Drawing Sheets

```
Algorithm:Labeling(operator Oⱼ, input channel Iₖ,
output channel C, input event e)

if (Oⱼ.type == "Emit") then
        /* create id for new event, create label, output event */
        e.id = CreateId(e,Iₖ) ;
        /* e. label is an n-ary label; kᵗʰ position becomes e.id */
        e. label = (0,...,0, e.id, 0,...,0) ;
        e. active = k ;
        Push (C,e) ;
else
        /* when an event is processed, the result is labeled with
        the maximum value of contributing labels */
        Result = Process( Oⱼ,e ) ;
        forall elements e' from Result do
                /* update labeling of e' with labels from
                contributing active and passive events */
                e'.label = e.label ;
                forall elements p from passiveContributors( e') do
                    |    e'.label = Max (e'.label,p.label ) ;
                end
                e'.active = e.active ;
                Push (C,e') ;         902
        end
end
Pop (Iₖ,e ) ;
```

FIG. 10

```
Algorithm:Detection(output channel C, pending events E)         1000

L = labels (E);
forall labels l from L do
        /* if label l and all labels preceding l in the same stream
        not active in any queue anymore, remove l from L */
        if ( ¬ hasActiveAncestor(l, input Channel(l))) then
            |    L = L - l;
            end                1002
end
if (L = ∅) then
        /* if now L is empty, output in consistent state */
        forall events e from E do
            |    Push (C,e);
        end
        E = ∅;
end
```

FIG. 11

```
Algorithm:ProcessToken(operator O_j, input event e,
input channel I_k, token set T, output Out)        1100 if (e.IsToken ()) then
        T = T U {e};
        /* if the token set is complete, with one token from each
        input */
        if (T.IsComplete ()) then
                t' = NewToken ();
                Push(Out, t');
                /* reset T */;
                T = ∅;
        end
else
    |    Process (O_j, e);
end
```

PROVIDING CONSISTENCY IN PROCESSING DATA STREAMS

BACKGROUND OF THE INVENTION

1. Field of the Invention

The present invention relates generally to an improved data processing system. More specifically, the present invention is directed to a computer implemented method, system, and computer usable program code for providing correct output consistency for continuous queries with processing structures that are directed acyclic graphs.

2. Description of the Related Art

Continuous queries are the core of real-time monitoring systems that are critical to various domains, such as health care applications, business process monitoring applications, financial applications, and environment protection applications. These real-time monitoring systems are increasingly automated such that the vast amounts of information produced by these systems are beyond the capacity of manual processing. One example of large scale monitoring is the tracking of goods in time and space, which is enabled by the use of radio frequency identification (RFID) tags and readers. Similarly in the context of a business domain, activities are run by processes that are usually monitored for performance and quality by using key performance indicators. Events that are emitted by states of business processes may give an indication of a slowdown in process performance and may lead to a better understanding of the root causes in the case of errors and exceptions.

Continuous queries enable alerts, predictions, and early warning in these various domains. However, for many applications it is essential that these continuous queries only generate consistent results. In other words, the generated results must be obtained by completely processing a contiguous set of input. Currently, the consistency of the generated results cannot be assessed by the receiving applications or users because only the query processor has enough internal information to determine whether the output has reached a consistent state.

The main challenge is the lack of synchronization in the stream processing engine (SPE), where query operators independently process incoming events and communicate through queues. For efficiency, scheduling of event processing is enforced between operators, but not the scheduling of event processing within an operator that may have multiple input streams. These events are generated by event sources and are sent to the SPE for processing.

At the application/user level, the streaming output is displayed either incrementally, which is refreshed with every new output tuple, or periodically. Either way, there is no guarantee that the streaming output reflects a correct output of the SPE for an input event sequence. From an application/user's perspective, the SPE is a black box. In fact, inside the SPE there may be delays and scheduling policies that affect the order of the output tuples. Consequently, there is no way for the application/user to distinguish between output sequences that are consistent with the input streams and output sequences that are inconsistent with the input streams.

Therefore, it would be beneficial to have an improved computer implemented method, system, and computer usable program code for providing correct output consistency for continuous queries with processing structures that are directed acyclic graphs.

SUMMARY OF THE INVENTION

Illustrative embodiments provide a computer implemented method, system, and computer usable program code for providing consistency guarantees in a data stream processing engine. Consistency tracking information is attached to data streams coming into the data stream processing engine. The consistency tracking information is propagated through a plurality of streaming operators that process the data streams within the data stream processing engine. Then, the propagated consistency tracking information is used to detect a consistent state in an output stream.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 9 is an illustration of an exemplary event labeling algorithm in accordance with an illustrative embodiment;

FIG. 10 is an illustration of an exemplary event label detection algorithm in accordance with an illustrative embodiment; and FIG. 11 is an illustration of an exemplary synchronization token processing algorithm in accordance with an illustrative embodiment.

DETAILED DESCRIPTION OF THE PREFERRED EMBODIMENT

Figure 1:
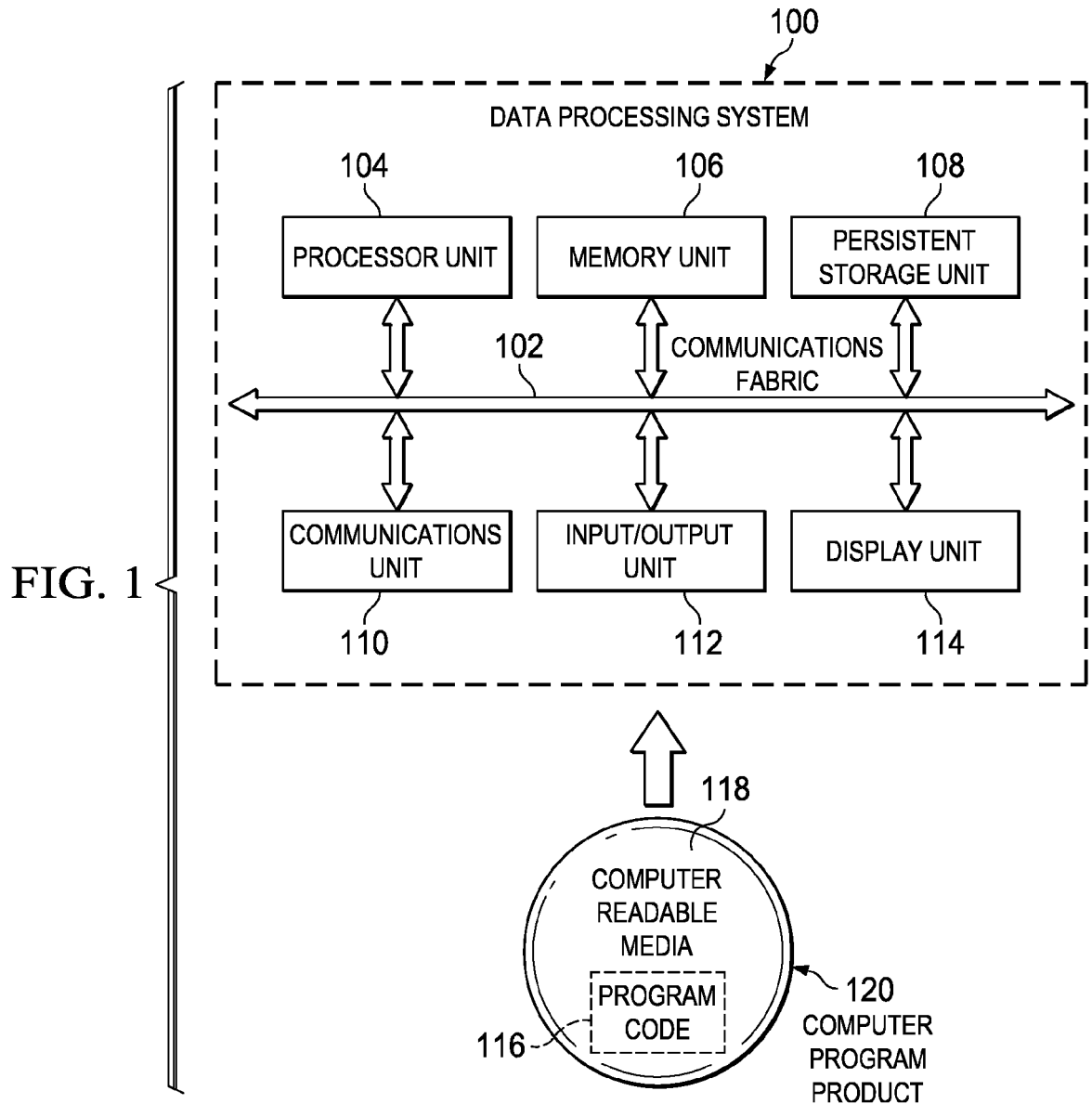
FIG. 1 is a diagram of a data processing system in which illustrative embodiments may be implemented.

With reference now to the figures and in particular with reference to FIG. 1, an exemplary diagram of a data processing environment is provided in which illustrative embodiments may be implemented. It should be appreciated that FIG. 1 is only exemplary and is not intended to assert or imply any limitation with regard to data processing environments in which different illustrative embodiments may be implemented. Many modifications to the depicted environment may be made.

FIG. 1 depicts a diagram of a data processing system in which illustrative embodiments may be implemented. In this illustrative example, data processing system 100 includes communications fabric 102, which provides communications between processor unit 104, memory unit 106, persistent storage unit 108, communications unit 110, input/output (I/O) unit 112, and display unit 114.

Processor unit 104 serves to execute instructions for software that may be loaded into memory unit 106. Processor unit 104 may be a set of one or more processors or may be a multi-processor core, depending on the particular implementation. Further, processor unit 104 may be implemented using one or more heterogeneous processor systems in which a main processor is present with secondary processors on a single chip. As another illustrative example, processor unit 104 may be a symmetric multi-processor system containing multiple processors of the same type.

Memory unit 106, in these examples, may be, for example, a random access memory (RAM). Persistent storage unit 108 may take various forms depending on the particular implementation. For example, persistent storage unit 108 may contain one or more components or devices, such as a hard drive, a flash memory, a rewritable optical disk, a rewritable magnetic tape, or some combination of the above. The media used by persistent storage unit 108 also may be removable. For example, a removable hard drive may be used for persistent storage unit 108.

Communications unit 110, in these examples, provides for communications with other data processing systems or devices. In these examples, communications unit 110 is a network interface card. Communications unit 110 may provide communications through the use of either or both physical and wireless communications links.

Input/output unit 112 allows for input and output of data with other devices that may be connected to data processing system 100. For example, input/output unit 112 may provide a connection for user input through a keyboard and mouse. Further, input/output unit 112 may send output to a printer. Display unit 114 provides a mechanism to display information to the user.

Instructions for an operating system and applications or programs are located on persistent storage unit 108. These instructions may be loaded into memory unit 106 for execution by processor unit 104. The processes of different illustrative embodiments may be performed by processor unit 104 using computer implemented instructions, which may be located in a memory, such as memory unit 106. These instructions are referred to as, program code, computer usable program code, or computer readable program code that may be read and executed by a processor in processor unit 104. The program code in the different illustrative embodiments may be embodied on different physical or tangible computer readable media, such as memory unit 106 or persistent storage unit 108.

Program code 116 is located in a functional form on computer readable media 118 and may be loaded onto or transferred to data processing system 100 for execution by processor unit 104. Program code 116 and computer readable media 118 form computer program product 120 in these examples. In one example, computer readable media 118 may be in a tangible form, such as, for example, an optical or magnetic disc that is inserted or placed into a drive or other device that is part of persistent storage unit 108 for transfer onto a storage device, such as a hard drive that is part of persistent storage unit 108. In a tangible form, computer readable media 118 also may take the form of a persistent storage, such as a hard drive or a flash memory that is connected to data processing system 100. The tangible form of computer readable media 118 is also referred to as computer recordable storage media.

Alternatively, program code 116 may be transferred to data processing system 100 from computer readable media 118 through a communications link to communications unit 110 and/or through a connection to input/output unit 112. The communications link and/or the connection may be physical or wireless in the illustrative examples. The computer readable media also may take the form of non-tangible media, such as communications links or wireless transmissions containing the program code.

The different components illustrated for data processing system 100 are not meant to provide architectural limitations to the manner in which different illustrative embodiments may be implemented. The different illustrative embodiments may be implemented in a data processing system including components in addition to, or in place of, those illustrated for data processing system 100. Other components shown in FIG. 1 may be varied from the illustrative examples shown.

For example, a bus system may be used to implement communications fabric 102 and may comprise one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory unit 106 or a cache, such as found in an interface and memory controller hub, which may be present in communications fabric 102.

Illustrative embodiments provide a computer implemented method, system, and computer usable program code for providing consistency guarantees in a data stream processing engine. The data stream processing engine uses a stream consistency manager to attach consistency tracking information to data streams coming into the data stream processing engine. The consistency tracking information may be either synchronization tokens or event labels. The stream consistency manager propagates the consistency tracking information through a plurality of streaming query operators that process the data streams within the data stream processing engine. Then, the stream consistency manager uses the propagated consistency tracking information to detect a consistent state in an output stream.

The stream consistency manager may detect the consistent state in the output stream after each streaming operator within the plurality of streaming operators using the synchronization tokens. The stream consistency manager uses emit operators to insert the synchronization tokens into the data streams coming into the data stream processing engine at predetermined time intervals. The frequency of inserting the synchronization tokens into the data streams may be modified at runtime to achieve optimal system performance.

Also, the stream consistency manager may use the synchronization tokens to provide snapshots of the system without halting execution of events. These snapshots may be used to recover the system after a system or component failure.

Alternatively, the stream consistency manager may detect the consistent state in the output stream after a final output streaming operator within the plurality of streaming operators using the event labels. The stream consistency manager attaches the event labels to each of the data streams coming into the data stream processing engine. Each of the data streams has a new unique event label attached to it. Each of the streaming operators assign a maximum label of participating events and propagate an active label of a triggering event. The stream consistency manager examines the event labels in the output stream to ensure that no other events with the same active labels can be produced in the future.

Thus, illustrative embodiments provide a framework that guarantees consistency of correct results. Further, illustrative embodiments may also provide partial results to the monitoring application or user, but the monitoring application/user will recognize the results as being partial and, if necessary, enforce consistent outputs. These consistency guarantees are tied to the input data stream sequence into the system, such that in addition to ensuring an anomaly-free output, the results may be reproduced and retraced.

Moreover, illustrative embodiments provide varying degrees of control over consistent output states. At one end of the spectrum, an illustrative embodiment may simply observe the output for consistency given certain labeling of the events. At the other end of the spectrum, an alterative illustrative embodiment may adapt a frequency of synchronization steps to meet continuous query processing correctness requirements, while satisfying throughput constraints. To meet the stringent latency and throughput requirements of stream processing, illustrative embodiments balance the requirements for operator synchronization with typical stream processing requirements of speed and operator autonomy.

In addition, illustrative embodiments may enable in-order snapshots of event processing by operators. Thus, illustrative embodiments may facilitate correct recovery after system failure.

Figure 2:
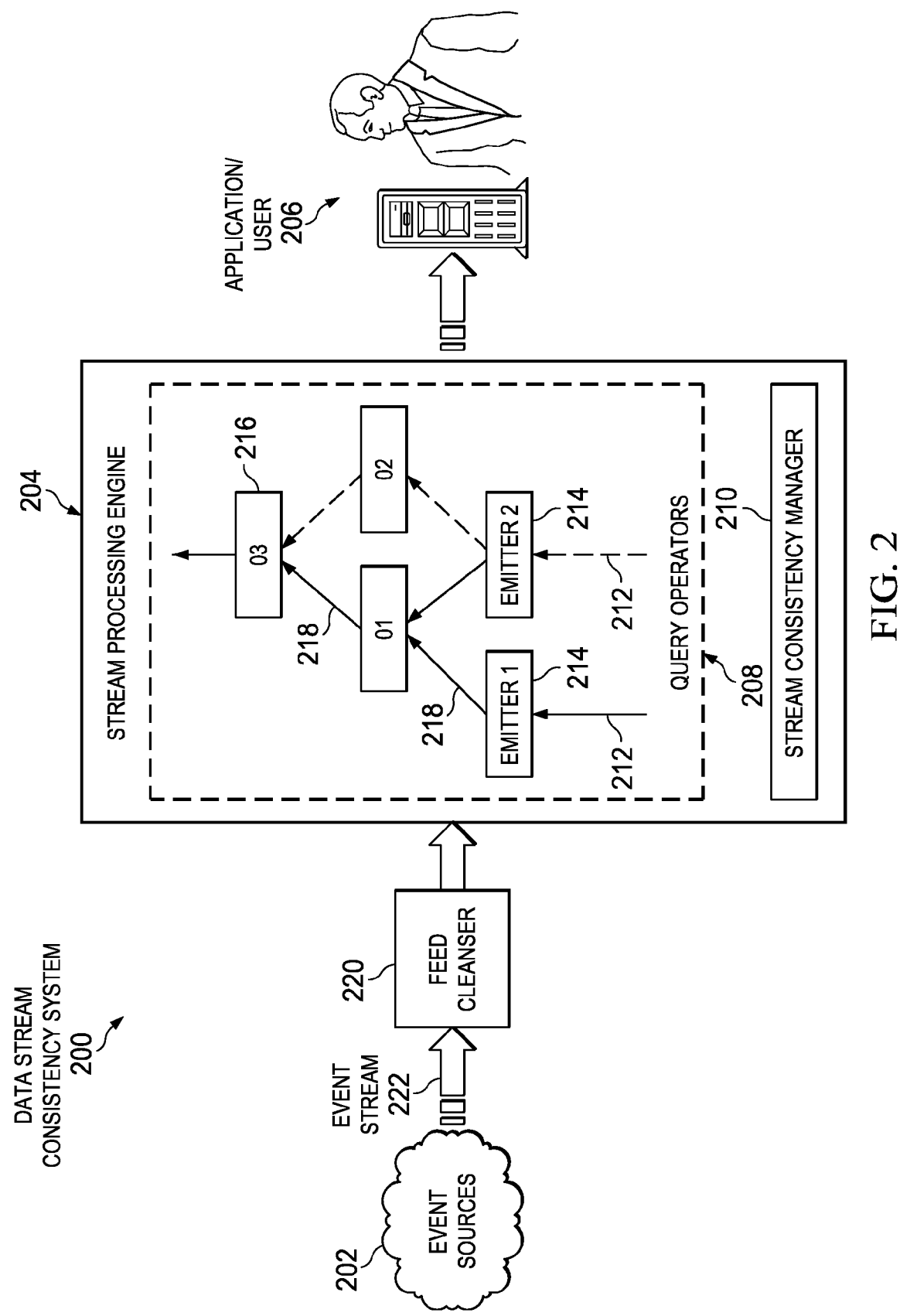
FIG. 2 is an exemplary illustration of a data stream consistency system in accordance with an illustrative embodiment.

With reference now to FIG. 2, an exemplary illustration of a data stream consistency system is depicted in accordance with an illustrative embodiment. Data stream consistency system 200 may, for example, be implemented in data processing system 100 in FIG. 1. Data stream consistency system 200 includes event sources 202, SPE 204, and application/user 206.

Event sources 202 are the sources of events for the continuous queries. Event sources 202 may be located locally within data stream consistency system 200. Alternatively, event sources 202 may be located remotely within a network of data processing systems and received by SPE 204 through a communications unit, such as communications unit 110 in FIG. 1.

SPE 204 manages the continuous queries, runs queries incrementally over the incoming events, and dispatches the results of the processed events to consuming application/user 206. The output is also usually streaming and, therefore, incremental. SPE 204 includes query operators 208 and stream consistency manager 210.

Stream consistency manager 210 is the component that enables illustrative embodiments to provide consistently correct output streams to consuming application/user 206. In particular, stream consistency manager 210 manages the labeling of events, the detecting of event labels within the system, and the insertion of synchronization tokens into the streams. It should be noted that illustrative embodiments may implement stream consistency manager 210 for each operator within query operators 208. Alternatively, illustrative embodiments may implement stream consistency manager 210 on a per computing node basis or may implement stream consistency manager 210 as a centralized component in a networked data processing system to be utilized by other data processing systems via the network.

Also, it should be noted that stream consistency manager 210 may be implemented entirely as software, entirely as hardware, or as a combination of both software and hardware. Further, a user, such as a system administrator, may enable and disable stream consistency manager 210 independently of other data stream consistency system 200 features and components.

Data stream consistency system 200 may optionally include feed cleanser 220. Feed cleanser 220 prepares event stream 222 for processing by SPE 204 by, for example, removing duplicate data and data errors. In addition, feed cleanser 220 may attach system timestamps and order the events according to certain time semantics.

A continuous query is composed of a number of operators, such as query operators 208. Typically, a continuous query is represented as a directed acyclic graph as illustrated in this example. Due to the "non-tree" nature of a continuous query, delays in different parts of the directed acyclic graph may produce inconsistent output states.

Query operators 208 process one or more inbound streams of events, such as inbound streams 212. Events may be in a tuple format. A tuple is an ordered set of values. Events may, for example, be sensor measurements, RFID readings, process notifications, and the like.

A particular type of operator within query operators 208 is emit operator 214. Emit operator 214 receives events from one inbound stream, formats the events if necessary, and sends the events to the relevant query operators. The query operators may, for example, be select operators, project operators, window join operators, or aggregate operators. These query operators incrementally output results. Also, a single output operator, such as output operator 216, generates the final output of a query. In general, query operators 208 consume events and send these events from one operator to another by using queues, such as queues 218.

A scheduler, which is not illustrated in this example, coordinates when and for how long query operators 208 run. Queues 218 are first in first out (FIFO) queues and are reliable. In other words, messages arrive in the order sent and no messages are lost. FIFO queues that transmit events into the system and from one operator to another are also referred to as channels. Only one channel exists between each pair of connected operators. Also, only one inbound channel exists for each stream of events entering the system.

Operator O1, which sends its output to operator O3, is a parent of operator O3. Conversely, operator O3 is the child of operator O1. Operator O1 is an ancestor of operator O3 when there is a path of parent-child links from operator O1 to operator O3.

The history $H(e, I)$ of a channel (I) is the ordered set of events read from that channel up to and including event (e). All events that are read from the channel later than e are not part of the history of the channel. Because history states are actually sets of events, a history is a prefix of a history. A prefix of an input stream is a contiguous set of events prior to a specified point in time (t). All events in a history have timestamps smaller than t and no later event can have a timestamp smaller than t. Thus, $H(e, I)<t$, where I denotes the inbound channel. It should be noted that timestamps will have semantics particular to the application, such as originator time, system time, etc.

The state $C(e, I)$ of a channel (I) is the set of events in the channel that include event (e), where all events other than e entered the channel before e. For clarification, an operator marks the top event in one of the operator's input queues as "in use" while processing the event and removes the event from the input queue only after the entire result of processing this event is placed in the output queue.

Consider an operator $O_j$ that processes an input event a. Event a is read from one of the input queues, the operator processes event a based on its current state, and the output events b and c are placed in the output queue. Events b and c are actively derived from event a or event a actively derives events b and c. In contrast, events are passively derived from events that are in the state of the operator and contribute to composing this output. For example, a streaming window join operator will join incoming event a with a window of events from another stream and, as a result, output event b may be composed of attributes from a, as well as attributes from an event d from the join window. Hence, event b is actively derived from event a and passively derived from event d. It should be noted that active and passive derivations are with respect to a given execution schedule.

Figure 3:
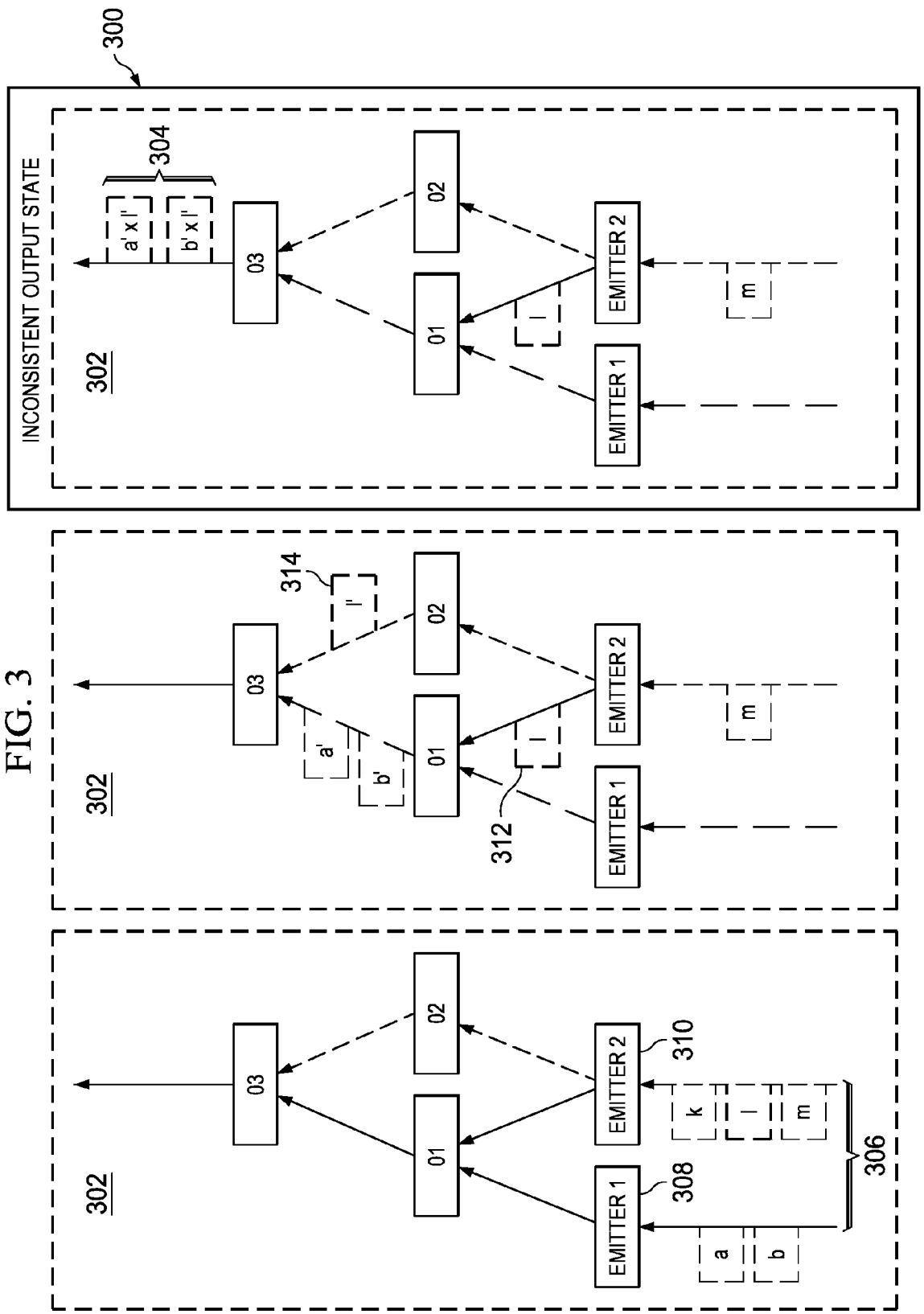
FIG. 3 is an exemplary illustration of an inconsistent output state in accordance with an illustrative embodiment.

With reference now to FIG. 3, an exemplary illustration of an inconsistent output state is depicted in accordance with an illustrative embodiment. Inconsistent output state 300 depicts output 304 of query operators 302 at a particular point in time. Query operators 302, such as query operators 208 in FIG. 2, process incoming events 306, which are events a, b, k, l, and m. Events a and b enter the system on one inbound channel to emit operator 308, while events k, l, and m enter the system on another inbound channel to emit operator 310.

The query is composed of operators O1, O2, and O3 according to the directed acyclic graph shown in this example. Emit operators 308 and 310 receive inbound input streams from two inbound channels and forward the streams to operators O1 and O2. The output of operators O1 and O2 is processed by operator O3.

This illustrative example shows a snapshot of the system at a point in time when the events in the left inbound channel are a and b, while the events in the right inbound channel are k, l, and m. Events a and b from emit operator 308 are processed first by the operator O1, while operator O2 processes the first two events, k and l, from emit operator 310.

Due to different scheduling and computational requirements, operators O1 and O2 do not process the events from the common channel at the same time. At some point in time, event l 312 is still in the input channel of operator O1, while event l', which is actively derived from event l through operator O2, is in the inbound queue of operator O3. Next, operator O3 processes event l'.

Now, the problem at this point in time is that the state of output 304 reflects only partially the effect of processing event l. Output 304 of operator O3 incorporates the effects of event l, however operator O3's parent, which is operator O1, has not yet processed event l. Because output 304 at this point in time is an internal anomaly, the receiver of output 304, such as, for example, application/user 206 in FIG. 2, has no indication that the result is incomplete and incorrect to use.

As a result, this example illustrates the need for output 304 to be update-complete. Consequently, illustrative embodiments implement the following definition to guarantee that events actively derived from an input event are either all included in output 304 or none of the actively derived events are included in output 304.

An output state of an operator is defined as $C(e_0, Out(O_j))$. Therefore, update-completeness is defined as follows: Definition 1: An output state $C(e_0, Out(O_j))$ of an operator $O_j$ is update-complete iff: for all e', e" in $out(O_j)$, if $e' < e_0$ and $e'' > e_0$ then the event that actively derived e' is different from the event that actively derived e".

In other words, event e" cannot exist if event e" is produced by operator $O_j$ later than event $e_0$, which is actively derived from the same input event as event e' in $C(e_0, Out(O_j))$. It should be noted that update-completeness is based on active-derivation, which is specific to the processing sequence followed by the system. Thus, for the same input events, a different scheduling decision may lead to different decisions on update-completeness.

Update-completeness allows for outputs that include effects of some input events and exclude effects of other interleaving input events. In other words, update-completeness allows for output to be the result of selectively processing input events, which makes "holes" in the input stream. If all events in the output are update-complete, then the corresponding inbound events, which actively derived this output, must have been fully processed by the query operators.

However, this does not guarantee that there is no other inbound event whose processing was delayed. Therefore, if an output is update-complete, it still may not correspond to a prefix of the inbound input. A stronger definition, which is input-prefix update-completeness, imposes restrictions on the output to be update-complete and also to represent the execution over an entire input of prefixes.

The output state of operator $O_j$ is $C(e_0, Out(O_j))$ and the inbound inputs are $I_1, \ldots, I_i, \ldots I_p$. The current histories of the inbound events are $H(e_i, I_i)$, $1 \leq i \leq p$. For given events $e'_i$ in $H(e_i, I_i)$, $1 \leq i \leq p$, the input-prefix $H[H(e'_1, I_1), \ldots H(e'_i, I_i), \ldots H(e'_p, I_p)]$ is the set formed by the corresponding prefixes of the current history of each inbound stream.

Definition 2: An output state $C(e_0, Out(O_j))$ of an operator $O_j$ is input-prefix update-complete iff there exist $e'_i$ in $H(e_i, I_i)$, $1 \leq i \leq p$ such that: $A_{Out(Oj)}(H[H(e'_1, I_1), \ldots H(e'_i, I_i), \ldots H(e'_p, I_p)]) = C(e_0, Out(O_j))$. In other words, input-prefix update-completeness ensures that there is a prefix of inputs such that the output state only contains those events that are actively derived from events in that particular prefix of inputs. As a result, this definition limits the output guarantee to a given execution sequence.

Next, a broader notion of correctness is defined based on input-prefix consistency, which does not depend on the internal decisions of the system on the processing sequence. Let input prefixes be $H[H(e'_1, I_1), \ldots H(e'_i, I_i), \ldots H(e'_p, I_p)]$. Also, let $Q[H[ \ldots ]]$ be the result events after running the computation of the deterministic query (Q) over all and only those events in prefix $H[ \ldots ]$.

Consequently, input-prefix consistency is defined as follows: Definition 3: The output $C(e_0, Out(O_j))$ of an operator $O_j$ is input-prefix consistent iff for all i, $1 \leq i \leq p$, there exist $e'_i$ in $H(e_i, I_i)$, such that: $Q(H[H(e'_1, I_1), \ldots H(e'_i, I_i), \ldots H(e'_p, I_p)]) = C(e_0, Out(O_j))$. In other words, an output is input-prefix consistent if the output corresponds to a prefix of the inbound inputs. That is, all results of processing the events in these prefix sets are included in the output and no event in the output exists that was not derived only from events in the prefix sets. As a result, input-prefix consistency guarantees reproducibility of results because any execution schedule over the same prefix of inbound inputs will produce the same results.

However, an input prefix is a set of prefixes of all inbound channels that are not necessarily synchronized. If a system needs to guarantee an output where the input prefixes are synchronized, then the following definition may be more appropriate. Definition 4: synchronized input-prefix consistency. The output $C(e_0, Out(O_j))$ of an operator $O_j$ is synchronized input-prefix consistent iff there exists a time t such that: $Q(H[H(e'_1, I_1), \ldots H(e'_i, I_i), \ldots H(e'_p, I_p)]) = C(e_0, Out(O_j))$, where for all i, $1 \leq i \leq p$, $e'_i$ is the last event in the history of $I_i$ such that $e'_i < t$. In other words, the output of an operator is synchronized input-prefix consistent if the output is equal to the output obtained by processing all and only the input events that enter the system from any inbound channel before a certain time t.

By way of review, if an output is input-prefix consistent, then the output requires that a processing order exists that would recognize the output as update-complete and that no "holes" exist in processing the input. The difference between input-prefix consistency and input-prefix update-completeness is that the latter imposes update-completeness for a given execution of event processing, while the former only requires that the output correspond to some possible execution. Input-prefix consistency is only based on the inbound inputs and SPE output. By contrast, input-prefix update-completeness is tied to the processing order of the events within the SPE.

Without access to information about the state of ancestor operators, an external application or user cannot differentiate between a consistent and an inconsistent output state. For this reason illustrative embodiments throughout the entire operator chain distinguish between active and passive events, as well as keep track of queue states.

Figure 4:
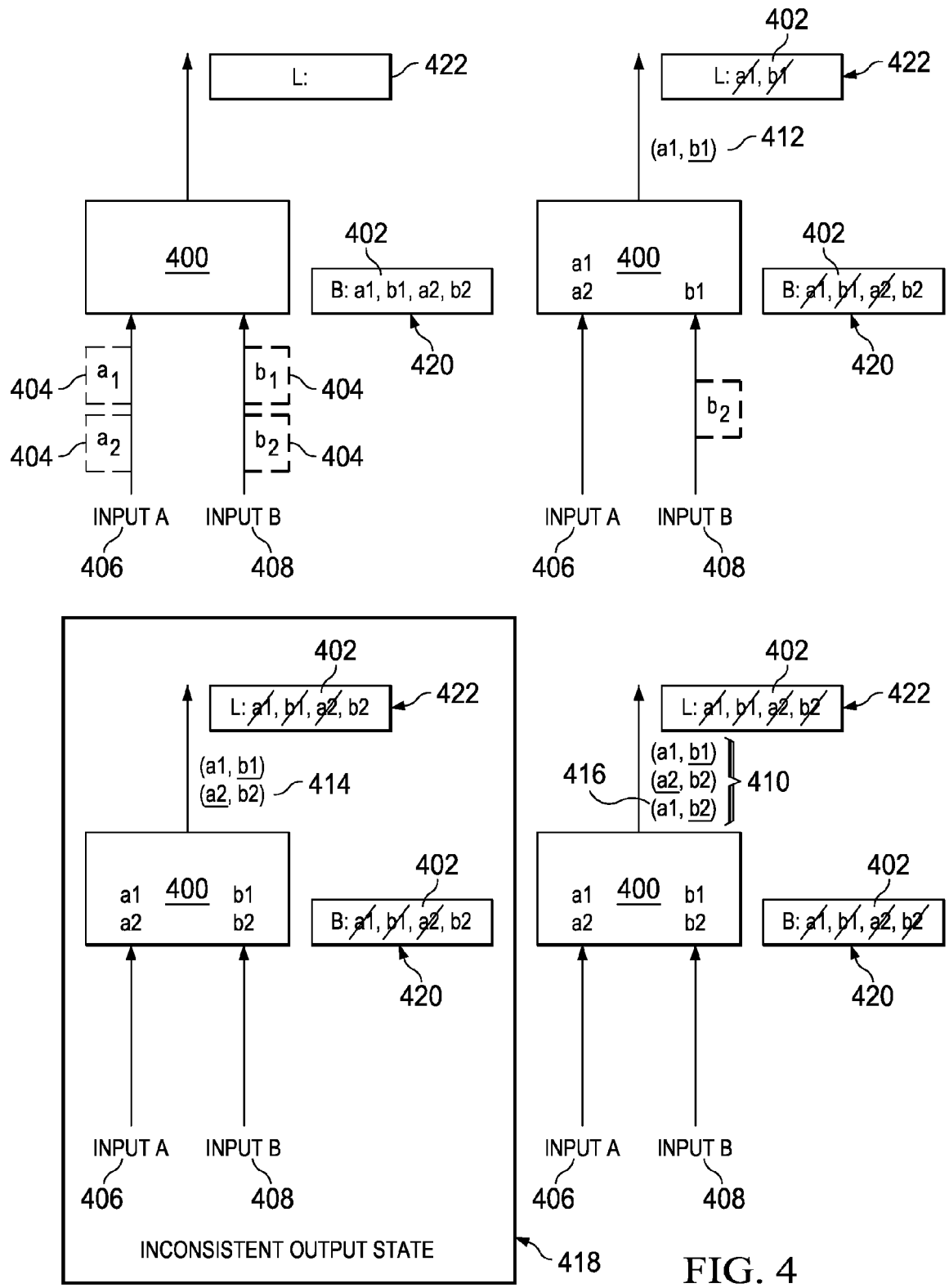
FIG. 4 is an exemplary illustration of event labeling in accordance with an illustrative embodiment.

With reference now to FIG. 4, an exemplary illustration of event labeling is depicted in accordance with an illustrative embodiment. The labeling method (also known as the wait and see heeding method) illustrated in this example, achieves output consistency guarantees without impacting operator scheduling. In other words, this labeling method is considered non-intrusive because the stream consistency manager, such as stream consistency manager 210 in FIG. 2, does not interfere with the operation of SPE 400, such as SPE 204 in FIG. 2, but only monitors event labels 402 to determine when consistent states are achieved for each of the events. The main idea is that the stream consistency manager labels events, such as events 404, when each event enters SPE 400 from inbound streams, such as inbound stream A 406 and inbound stream B 408. Then, the stream consistency manager re-labels the events when output by operators, such as query operators 208 in FIG. 2.

When an event is received in the final output buffer of the query, the stream consistency manager verifies that the output is a consistent state based on the labels of events in the output buffer and the labels of events still being processed in SPE 400. It should be noted that list B 420 is a list, or a multiset list, of all active labels within SPE 400. In addition, list L 422 is a list of all labels in the final output.

If the state is consistent, then the stream consistency manager sends the output to the consuming application/user, such as application/user 206 in FIG. 2. Otherwise, if the state is not consistent, then the stream consistency manager keeps the event in the output buffer until consistency is guaranteed at a later time. Alternatively, the stream consistency manager may send a partial result to the application/user, but this partial result output is labeled complete/incomplete.

The stream consistency manager is able to guarantee correct recognition of consistent state output by tracking a very limited event lineage (active and passive derivation dependencies) using event labels 402. Each label is an n-ary vector of values, where n is the number of inbound inputs. When an inbound event is received by an emit operator, such as emit operator 214 in FIG. 2, from an inbound stream ($I_k$) (k is the identification (id) for the inbound stream and is known by all emit operators) the id is stored to the label (e.g., 0, . . . , eid, . . . , 0) such that the label contains an event identification (eid) in the k-th position and zeros everywhere else. Because no more than one emit operator exists for each inbound stream, event ids are unique within each inbound input stream and are in increasing order over time.

An operator that processes an input event e calculates component-wise the maximum value between the label of event e and all passively deriving events that participate in the processing of event e. The maximum value for contributing labels is stored in the state of the operator. In addition, the label metadata differentiates between active and passive labels. The k-th label in the output event is set to active when the k-th label in the actively deriving input event was active. In the case of emit operators for inbound stream $I_k$, the k-th label, which is the only label that is non-zero, is set to active.

Labels with active or passive markers allow the stream consistency manager to track active and passive lineage, which is important for determining whether any events still in SPE 400 may cause additional outputs. If there are still events in SPE 400 that will cause additional outputs, then the output is rendered inconsistent. Tracking active derivation is necessary to ensure that if an event e' in the output is actively derived from an event e in the inbound input, then the stream consistency manager waits for all events actively derived from e to finish processing. Definition 2, which is discussed above, defines this process. The stream consistency manager does this process by comparing active labels in the output with active labels still transient, or being processed, in SPE 400.

For example, events 404 from inbound stream A 406 and inbound stream B 408 are processed in the order of arrival. In this example, events 404 are joined such that the complete output generated from these events is output 410, which is a1b1, a2b2, and a1b2. Due to scheduling inside SPE 400, first output event 412, which is a1b1, is actively derived from b1. Second output event 414, which is a2b2, is actively derived from a2. Finally, the third output event 416, which is a1b2, is actively derived from b2. However, third output event 416 is delayed due to scheduling.

If the stream consistency manager only tracks active derivation lineage, the stream consistency manager may incorrectly assume that the current output is consistent. By also tracking passive derivation, the stream consistency manager is able to detect that the passively deriving event b2 is still in SPE 400 and may actively derive more events later. This incorrect current output state is shown as inconsistent output state 418.

As shown in this illustrative example, it is possible to have an event e' in the output passively derived from an event e in the inbound stream, while some events actively derived from e are still being processed in SPE 400. Consequently, the output reflects the existence of e, but only partially. To avoid such a result, the stream consistency manager needs to also compare passive labels in the output with active labels in SPE 400.

Given this labeling method of illustrative embodiments, the stream consistency manager can detect, at the query output level, whether a state is consistent, or in other words, whether there are more events in SPE 400 that may cause actively derived output events in the future. The stream consistency manager is able to do this by keeping a buffer E of events to be output to the consuming application/user. The stream consistency manager delays the sending out of these events from buffer E to the consuming application/user until after an input-prefix update-consistency is reached. The basic idea is to check each event e within buffer E as to whether any events exist within any queue in SPE 400 that have the same or a smaller label than e for any input channels and are marked active for that same channel. If no such event exists within any queue, then no more events exist in SPE 400, which generated e, that may generate additional events in the future. Therefore, it is now safe to output e from buffer E to the consuming application/user.

Figure 5:
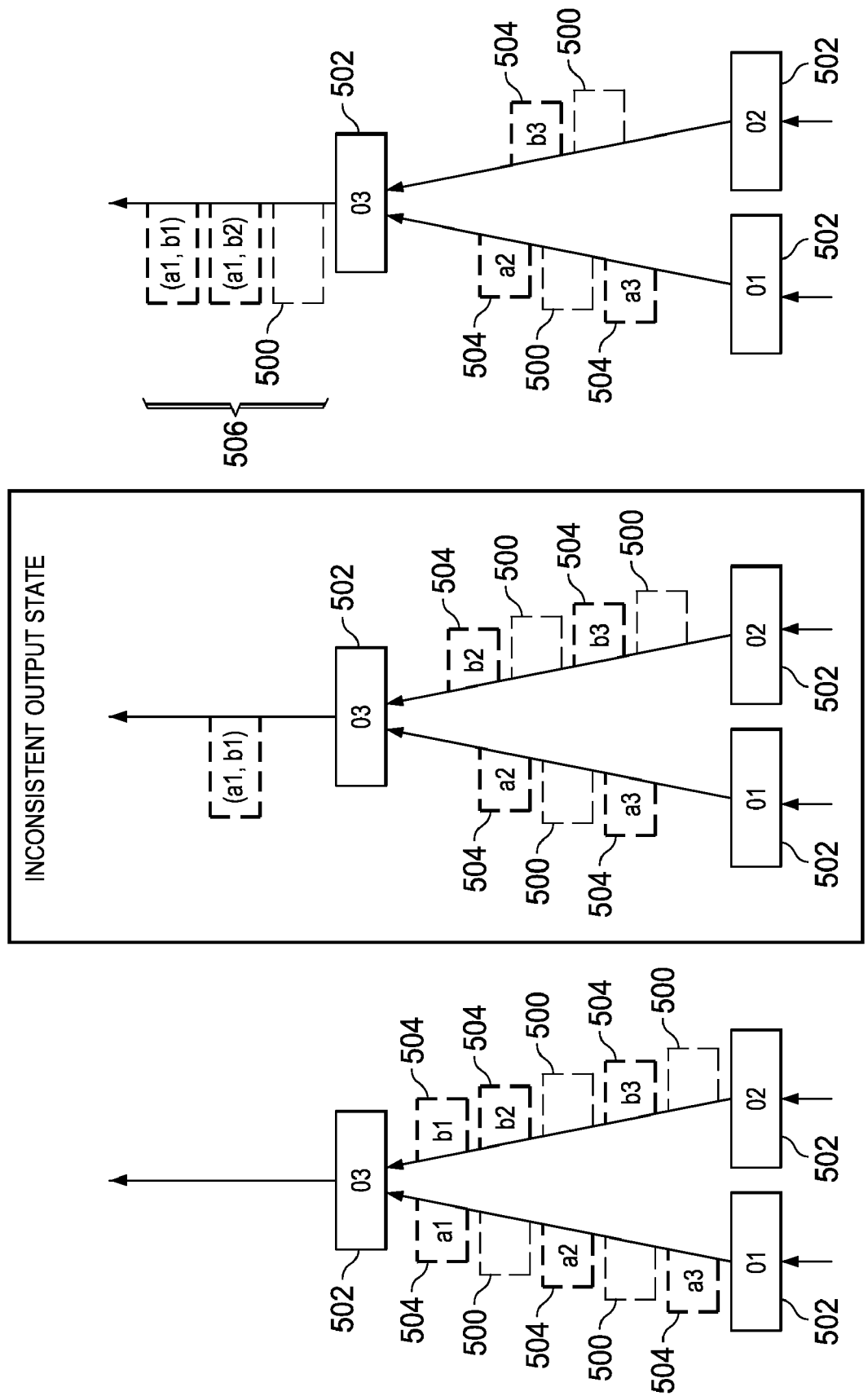
FIG. 5 is an exemplary illustration of inserting synchronization tokens into data streams in accordance with an illustrative embodiment.

With reference now to FIG. 5, an exemplary illustration of inserting synchronization tokens into data streams is depicted in accordance with an illustrative embodiment. Synchronization tokens 500 are artificial or empty events. In other words, synchronization tokens 500 are not processed the same as normal events by query operators 502, such as query operators 208 in FIG. 2.

A stream consistency manager, such as stream consistency manager 210 in FIG. 2, directs emit operators, such as emit operators 214 in FIG. 2, to generate and inject synchronization tokens 500 into a stream of events, such as events 504. Synchronization tokens 500 divide the flow of events into segments that have clear boundaries. The advantage of inserting synchronization tokens 500 into the stream of events is that illustrative embodiments are able to provide a consistent output, such as consistent output 506, at controlled intervals with very little impact on the system.

The emit operators generate and insert synchronization tokens 500 periodically into the input stream at predefined increments of time (T). A non-emit operator, such as query operators 502, will process events as usual until that operator receives a synchronization token from one of its input queues. This operator then blocks the reading of events from that queue, until a synchronization token is received from each of the other input queues. When all synchronization tokens are received, the operator generates a new output token and inserts that new output token in all the output queues of that operator. Whenever a token is received in the output of the last operator, the output is deemed to be in a consistent state, such as consistent output 506.

Because the emit operators send out synchronization tokens 500 at the same time interval, the same number of tokens are inserted into each event stream. An operator that integrates two or more streams will also integrate the synchronization tokens from each of the streams. In other words, the output synchronization token includes the first incoming synchronization token from each inbound stream. As a result, for each synchronization token in the input of the operator, there is exactly one synchronization token in the output. Thus, the cumulative number of synchronization tokens on any two paths from an operator to the operator's emit operators differ by at most a number equal to the number of operators in that path.

When a synchronization token (t) is received in the output, synchronization token t is the result of processing exactly one inbound token t from each inbound stream. Moreover, due to the token synchronization step at each operator, all output events e actively derived from inbound events that precede inbound token t will precede synchronization token t.

If two different emit operators generate and insert synchronization tokens 500 into their respective event streams at different times, the longer the time difference between the two associated synchronization tokens, the longer it takes for an operator to wait to integrate the associated synchronization tokens. The tendency of the system is to automatically slow down the first stream. Therefore, the generation of tokens at emit operators should be as close as possible on a global clock. However, even though for efficiency sake this synchronization of the periods is desirable, the correctness of the output does not depend on it.

One way to synchronize the tokens is to extend the query model with additional emitsynch operators. These emitsynch operators may be added for each cluster of emit operators that need to be synchronized. For high throughput however, the use of emitsynch operators should be avoided because these emitsynch operators may become bottlenecks in the system.

One advantage of this token-based approach is that no constraints exist on the scheduler, therefore, the scheduler may continue optimizing the order and timing of operators as needed. Furthermore, controlling the granularity of consistent states by inserting synchronization tokens at different rates is a straight-forward process.

Synchronization tokens 500 introduce an overhead in latency. This latency is the time it takes for operators to process events, which is measured starting from the emit operators and ending with the events effects reaching the final output operator. This latency overhead is the largest when the frequency of tokens is the greatest.

In an extreme case, synchronization tokens are inserted after each event. In this extreme case the overhead due to processing the synchronization tokens may become a significant factor of the total latency. However, if synchronization tokens are less frequent, for example, only one token for every two hundred events, the additional latency introduced by the synchronization tokens is imperceptible. Conversely, the more frequent the synchronization tokens, the shorter the wait time for the next consistent state, which directly affects the consuming application/user that is utilizing the results of the query.

Therefore, two conflicting requirements exist in setting the frequency of synchronization tokens 500. The first is keeping the interval between synchronization tokens as large as possible so that throughput is not affected due to an increase in latency. The second is keeping the interval between synchronization tokens as small as possible in order to provide more frequent consistent output.

One way to set the synchronization token frequency is to start with an initial inter-token period and then modifying the inter-token period at runtime to reach the optimum compromise between the two conflicting requirements. If the latency is affected too much and emit operators start creating increasing backlogs of events, then the inter-token period should be increased until the throughput is large enough for the system to be able to keep up with the incoming rate of events. The inter-token period should be kept as short as possible under the limitation that this inter-token period will not introduce backlogs and will frequently provide consistent output.

Also, a continuous query engine may fail, in which case the output is disrupted. The goal of correct recovery from a failure is to be able to replay the stream of events to reach the same output as if the system never failed. Two requirements for efficient recovery are: 1) persistence of all inbound events, which due to the amount of data may be done in a compressed form; and 2) persistence of periodic snapshots of the system. In the case of query operators, the passing of time needs to be simulated to ensure the correct results.

In an environment where queries are continuously running, it is challenging to take correct snapshots of operator states and queues without temporarily halting all execution of events. Thus, synchronization tokens 500 are very useful for enabling correct snapshots of the system without halting execution. For example, if some of synchronization tokens 500 are labeled as recovery tokens, then operators may persist their state right before processing and releasing their output synchronization token, which is after the operator receives one recovery token from each inbound stream. Because these recovery tokens travel through the entire system, operators may take snapshots in a sequential manner. Together, these snapshots recreate the state of the entire system, which may be later used as a starting point in a recovery process.

Figure 6A:
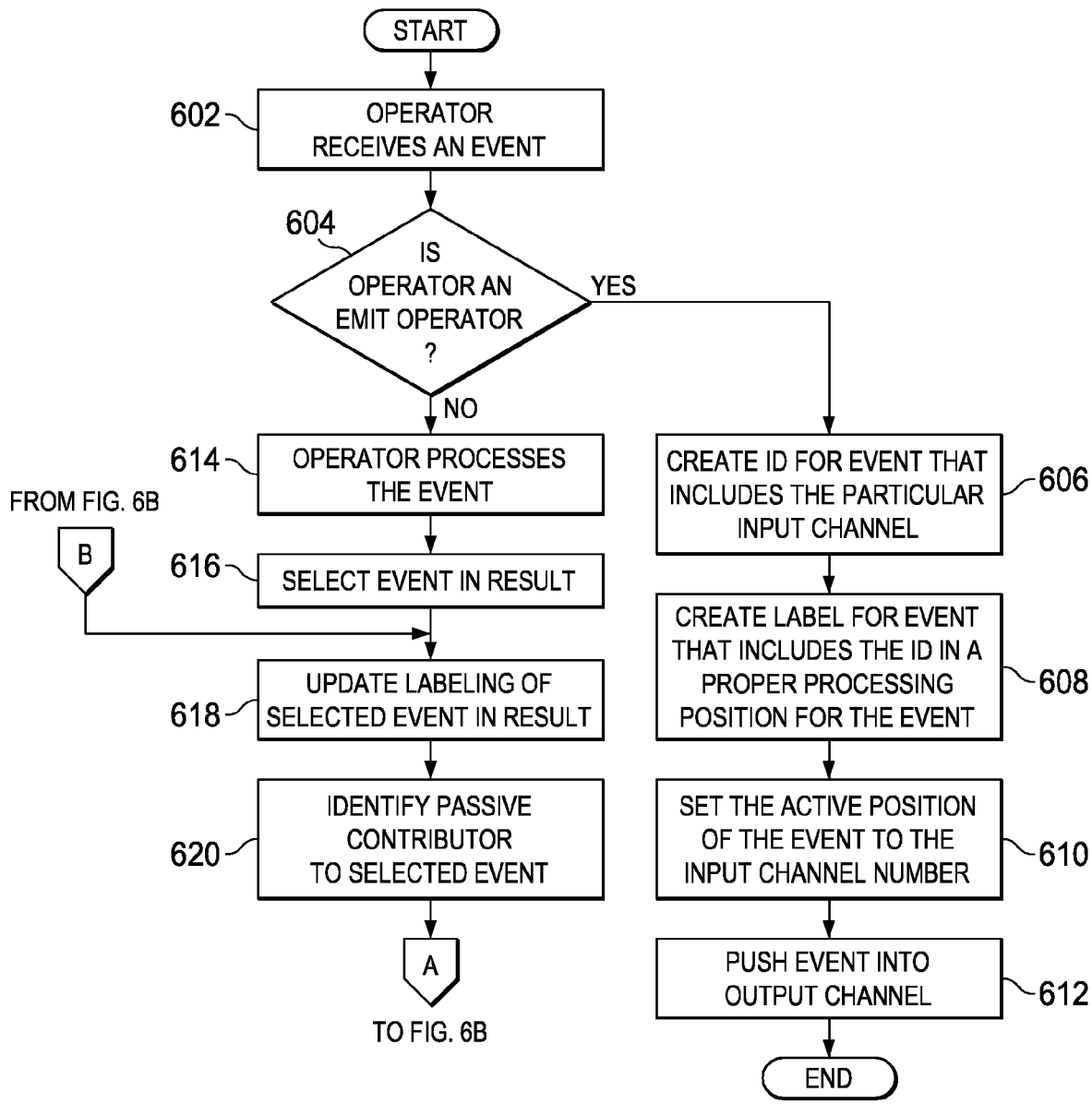
FIG. 6A and FIG. 6B is a flowchart illustrating an exemplary process for labeling events in accordance with an illustrative embodiment.
Figure 6B:
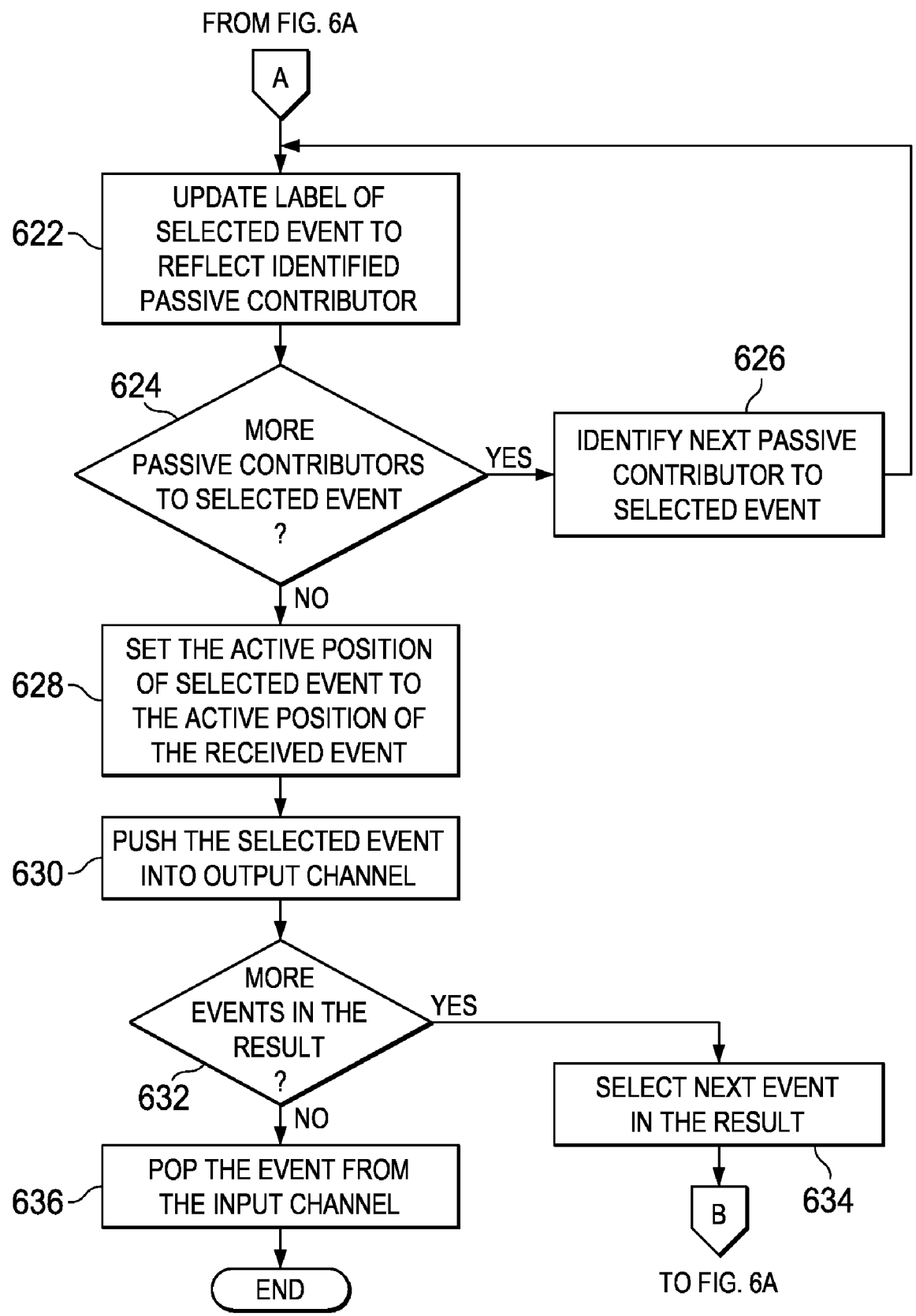

With reference now to FIG. 6A and FIG. 6B, a flowchart illustrating an exemplary process for labeling events is shown in accordance with an illustrative embodiment. The process shown in FIG. 6A and FIG. 6B may be implemented in an SPE, such as SPE 204 in FIG. 2.

The process begins when an operator within a set of query operators, such as query operators 208 in FIG. 2, receives an event (step 602). Then, the SPE utilizes a stream consistency manager, such as stream consistency manager 210 in FIG. 2, to make a determination as to whether the operator that received the event is an emit operator, such as emit operator 214 in FIG. 2 (step 604). If the operator that received the event is an emit operator, yes output of step 604, then the stream consistency manager creates an identification (ID) for the event (step 606). The ID includes identification for the particular input channel of the event.

Then, the stream consistency manager creates a label for the event (step 608). The label includes the ID created in step 606. The stream consistency manager places the ID within the label in the proper processing position for the event. Afterward, the stream consistency manager sets the active position of the event to the input channel number (step 610). Then, the operator pushes the event into the output channel (step 612). The process terminates thereafter.

Returning again to step 604, if the operator that received the event is not an emit operator, no output of step 604, then the operator processes the event (step 614). After the operator processes the event in step 614, the stream consistency manager selects an event in the result (step 616). Then, the stream consistency manager updates the labeling of the selected event in the result (step 618) by identifying a passive contributor to the selected event (step 620) and adding the identified passive contributor to the label of the selected event (step 622).

Then, the stream consistency manager makes a determination as to whether more passive contributors to the selected event exist (step 624). If more passive contributors to the selected event do exist, yes output of step 624, then the stream consistency manager identifies the next passive contributor to the selected event (step 626). The process returns to step 622 thereafter, where the stream consistency manager adds the next identified passive contributor to the label of the selected event.

If more passive contributors to the selected event do not exist, no output of step 624, then the stream consistency manager activates the selected event by setting an active marker in the label by copying the active marker of the received event (step 628). Subsequent to setting the active marker of the selected event in step 628, the stream consistency manager pushes the selected event into the output channel (step 630). Then, the stream consistency manager makes a determination as to whether more events exist in the result (step 632).

If more events do exist in the result, yes output of step 632, then the stream consistency manager selects the next event in the result (step 634). The process returns to step 618 thereafter where the stream consistency manager updates the labeling of the next selected event in the result. If more events do not exist in the result, no output of step 632, then the stream consistency manager pops the event from the input channel (step 636). The process terminates thereafter.

Figure 7:
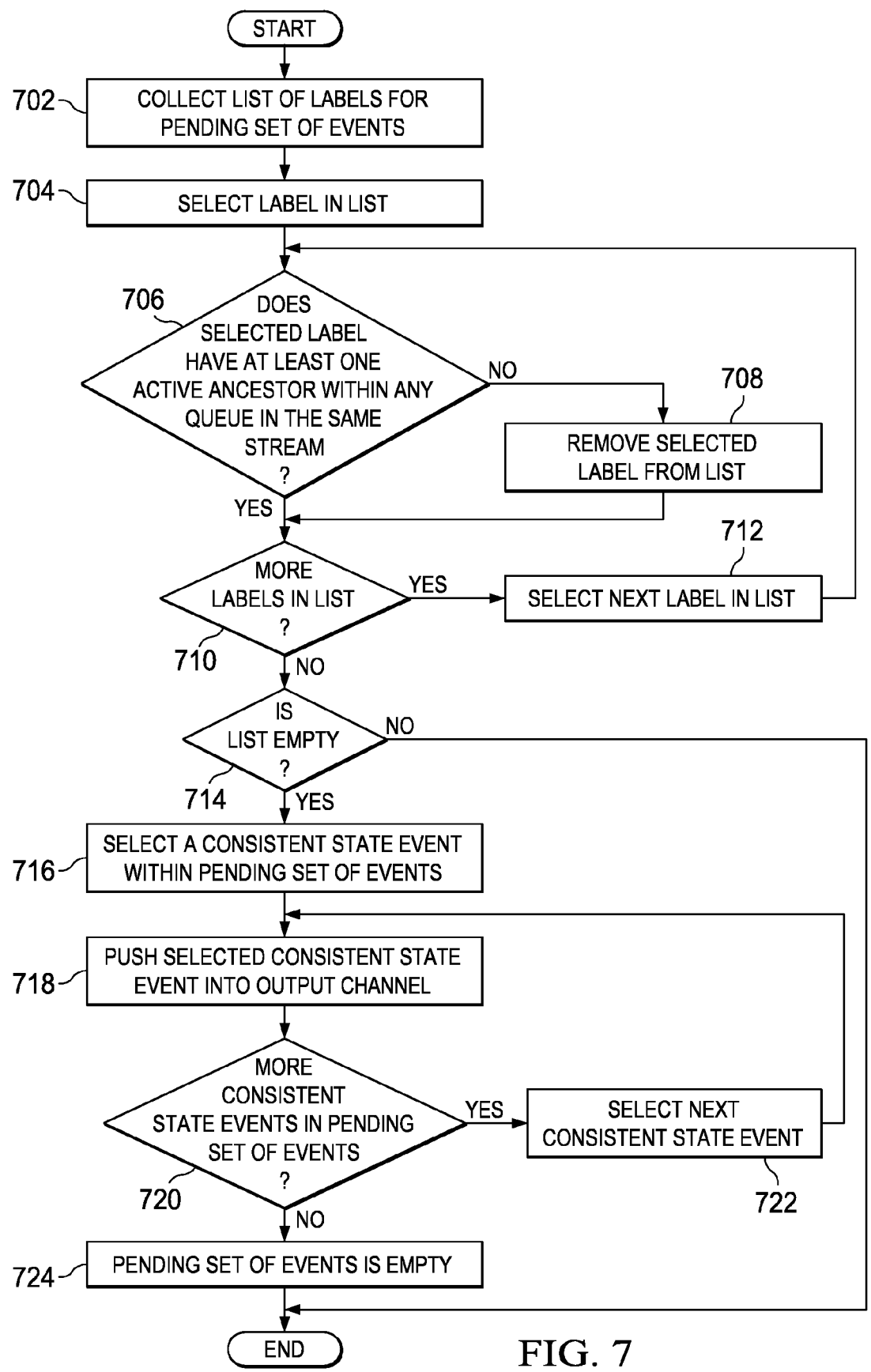
FIG. 7 is a flowchart illustrating an exemplary process for detecting event labels in accordance with an illustrative embodiment.

With reference now to FIG. 7, a flowchart illustrating an exemplary process for detecting event labels is shown in accordance with an illustrative embodiment. The process shown in FIG. 7 may be implemented in a stream consistency manager, such as stream consistency manager 210 in FIG. 2.

The process begins when the stream consistency manager collects a list of labels for a pending set of events (step 702). After collecting the list of labels in step 702, the stream consistency manager selects a label in the list of labels (step 704). Then, the stream consistency manager makes a determination as to whether the selected label has at least one active ancestor within any queue in the same stream (step 706).

If the selected label does not have at least one active ancestor within any queue in the same stream, no output of step 706, then the stream consistency manager removes the selected label from the list of labels (step 708). The process proceeds to step 710 thereafter. If the selected label does have at least one active ancestor within any queue in the same stream, yes output of step 706, then the stream consistency manager makes a determination as to whether more labels exist in the list of labels (step 710).

If more labels do exist in the list of labels, yes output of step 710, then the stream consistency manager selects the next label in the list (step 712). The process returns to step 706 thereafter where the stream consistency manager makes a determination as to whether the next selected label has at least one active ancestor within any queue in the same stream. If more labels do not exist in the list of labels, no output of step 710, then the stream consistency manager makes a determination as to whether the list of labels is empty (step 714).

If the list of labels is not empty, no output of step 714, then the process terminates thereafter. If the list of labels is empty, yes output of step 714, then the stream consistency manager selects a consistent state event within the pending set of events (step 716). Then, the stream consistency manager pushes the selected consistent state event into the output channel (step 718).

Afterward, the stream consistency manager makes a determination as to whether more consistent state events exist in the pending set of events (step 720). If more consistent state events do exist in the pending set of events, yes output of step 720, then the stream consistency manager selects the next consistent state event (step 722). The process returns to step 718 thereafter where the stream consistency manager pushes the next selected consistent state event into the output channel. If more consistent state events do not exist in the pending set of events, no output of step 720, then the pending set of events is empty (step 724) and the process terminates thereafter.

Figure 8:
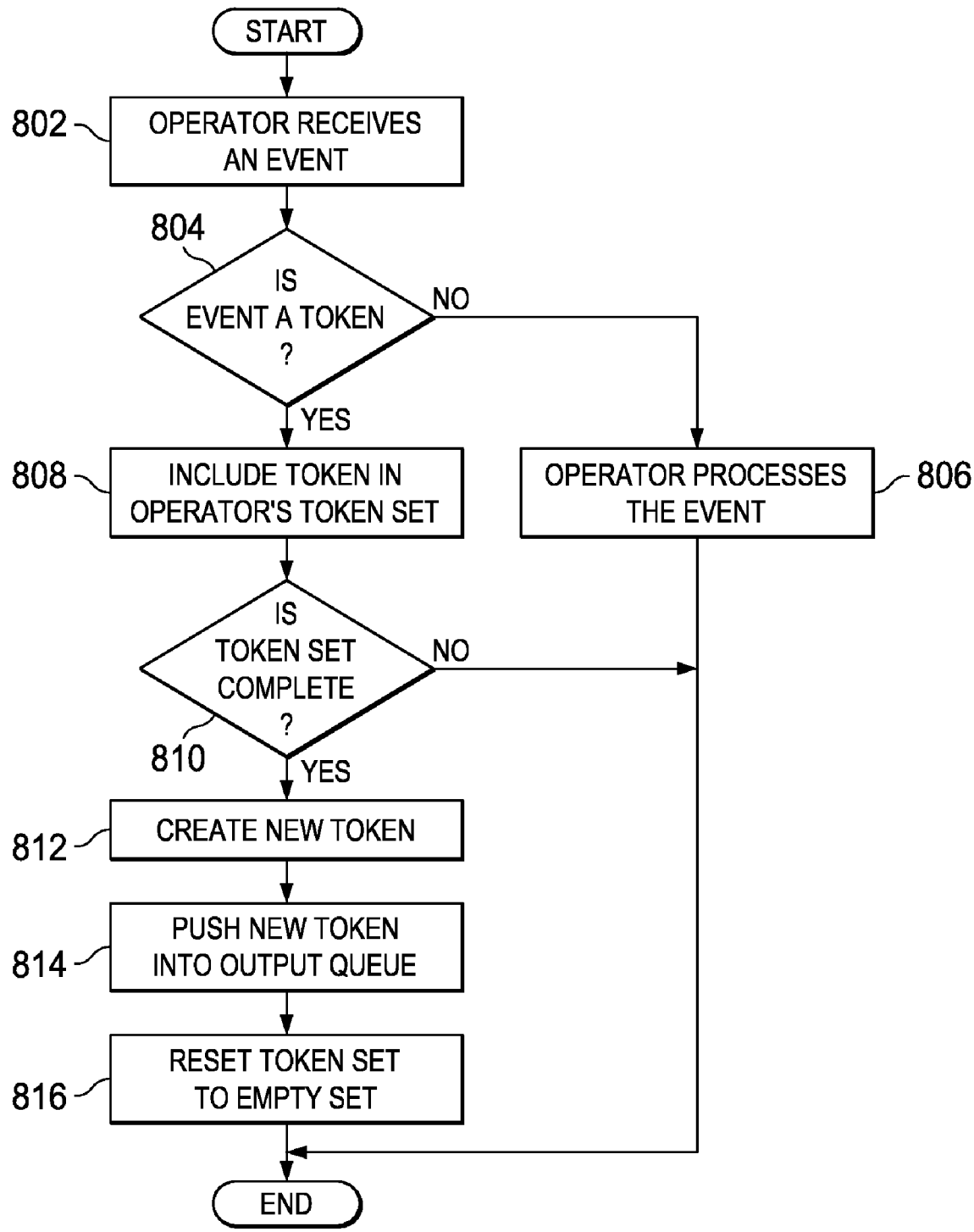
FIG. 8 is a flowchart illustrating an exemplary process for processing synchronization tokens in accordance with an illustrative embodiment.

With reference now to FIG. 8, a flowchart illustrating an exemplary process for processing synchronization tokens is shown in accordance with an illustrative embodiment. The process shown in FIG. 8 may be implemented in an SPE, such as SPE 204 in FIG. 2.

The process begins an operator within a set of query operators, such as query operators 208 in FIG. 2, receives an event (step 802). Then, the SPE utilizes a stream consistency manager, such as stream consistency manager 210 in FIG. 2, to make a determination as to whether the received event is a synchronization token (step 804). If the received event is not a synchronization token, no output of step 804, then the operator processes the event (step 806). The process terminates thereafter. If the received event is a synchronization token, yes output of step 804, then the stream consistency manager includes the synchronization token in the operator's token set (step 808).

Then, the stream consistency manager makes a determination as to whether a set of synchronization tokens is complete (step 810). The set of synchronization tokens is complete when the operator receives a synchronization token from each input stream. If the set of synchronization tokens is not complete, no output of step 810, then the process terminates thereafter. If the set of synchronization tokens is complete, yes output of step 810, then the stream consistency manager creates a new synchronization token (step 812). Then, the stream consistency manager pushes the new synchronization token into the output queue (step 814). Afterward, the stream consistency manager resets the set of synchronization tokens to the empty set (step 816). The process terminates thereafter.

With reference now to FIG. 9, an illustration of an exemplary event labeling algorithm is shown in accordance with an illustrative embodiment. Illustrative embodiments may locate event labeling algorithm 900 within, for example, a stream consistency manager, such as stream consistency manager 214 in FIG. 2. However, illustrative embodiments are not limited to locating event labeling algorithm 900 within the stream consistency manager. Illustrative embodiments may locate event labeling algorithm 900 within any component of the data processing system capable of storing event labeling algorithm 900.

Also, it should be noted that event labeling algorithm 900 is only intended as an example of one type of labeling algorithm that may be utilized by illustrative embodiments. In other words, illustrative embodiments are not restricted to the use of event labeling algorithm 900. Any algorithm capable of accomplishing the process of labeling events may be used by illustrative embodiments.

Event labeling algorithm 900 performs the task of labeling events within the SPE. Each operator within the set of query operators in the SPE executes event labeling algorithm 900 whenever a new event is generated. Event labeling algorithm 900 assigns the maximum value of contributing labels for participating events to the output event, as discussed above. In addition, event labeling algorithm 900 propagates the active marker from the actively deriving event to the output event.

It should be noted that in the case of aggregation operations, Max calculation 902 within event labeling algorithm 900 calculates the maximum value between the labels of the new incoming event, which is the actively deriving event, and all buffered events within the operator, which are the passively deriving events, that participate in the aggregation operation. In other words, events that do not fit the aggregation window do not participate in the maximum calculation.

With reference now to FIG. 10, an illustration of an exemplary event label detection algorithm is shown in accordance with an illustrative embodiment. Illustrative embodiments may locate event label detection algorithm 1000 within, for example, a stream consistency manager, such as stream consistency manager 214 in FIG. 2. However, illustrative embodiments are not limited to such. Illustrative embodiments may locate event label detection algorithm 1000 within any component capable of storing event label detection algorithm 1000. Also, it should be noted that event label detection algorithm 1000 is only intended as an example of one type of event label detection algorithm that may be utilized by illustrative embodiments. Any algorithm capable of accomplishing the process of event label detection may be used by illustrative embodiments.

Event label detection algorithm 1000 performs the task of detecting consistency points within the SPE. Event label detection algorithm 1000 is performed globally for each output channel. Event label detection algorithm 1000 first collects the labels from all pending events in E. Then, event label detection algorithm 1000 checks which of these collected labels have "ancestors" (i.e., events with smaller or equal active markers within the same input channel) in the SPE.

This check is described by predicate hasActiveAncestor 1002. Predicate hasActiveAncestor 1002 is defined as hasActiveAncestor(label l, channel $I_k$): there exists event e with label $(l_1, \ldots, l_n)$ in some queue s.t. $l_k \leq l$ and e.active=k. If none of the collected labels have such ancestors, the events in E constitute a consistent state and may be pushed into the output channel.

It should be noted that several alternative implementations exist for event label detection algorithm 1000. First, instead of event label detection algorithm 1000 inspecting all queues in the SPE for the evaluation of hasActiveAncestor, it is possible to maintain a multiset (M), which stores the active component of labels with their original input channel (Ik), of all events in all queues. When an event enters a channel between two operators, the corresponding active label is added to the multiset M. Also, when an event is removed from a channel, one occurrence of its active label is removed from the multiset M. Because M is a multiset list of all active labels within the system, a label will only be completely removed from multiset M when no more events exist in any queue that have that particular label marked as active. It should be noted that a label/inbound stream pair may occur multiple times in the system. Moreover, the stream consistency manager may maintain multiset M as an array of multisets, one for each inbound stream, which may further boost system performance. By implementing multiset M as an array of multisets, event label detection algorithm 1000 may more efficiently perform the check hasActiveAncestor 1002.

Second, the stream consistency manager may alter the frequency with which event label detection algorithm 1000 is executed. Event label detection algorithm 1000 may be executed every time a new output event is generated. However, it is possible that some of the pending events in E form a consistent state earlier than that. For example, if an active event is removed from an operator due to a filter condition, then a consistent state for remaining active events may be achieved earlier. In this case, the now consistent events would only be output once a new output event arrives. In order to output consistent events earlier, the stream consistency manager may execute event label detection algorithm 1000 whenever a new output event arrives or when an active event is removed from the system. Naturally, there is a trade-off between the overhead of the label detection check and the frequency of output consistent events.

With reference now to FIG. 11, an illustration of an exemplary synchronization token processing algorithm is shown in accordance with an illustrative embodiment. Illustrative embodiments may locate synchronization token processing algorithm 1100 within, for example, a stream consistency manager, such as stream consistency manager 214 in FIG. 2. However, illustrative embodiments are not limited to such. Illustrative embodiments may locate synchronization token processing algorithm 1100 within any component capable of storing synchronization token processing algorithm 1100. Also, it should be noted that synchronization token processing algorithm 1100 is only intended as an example of one type of synchronization token processing algorithm that may be utilized by illustrative embodiments. Any algorithm capable of synchronization token processing may be used by illustrative embodiments.

Synchronization token processing algorithm 1100 performs the task of actively enforcing consistent states by processing synchronization tokens within the SPE. First, synchronization token processing algorithm 1100 checks to see if an event received by an operator is a synchronization token. Second, if the event is not a synchronization token, then the operator processes the event. If the event is a synchronization token, then the operator unites the synchronization token with a particular event and determines whether the token set for the particular event is complete. Third, if the token set is complete for the particular event, then the operator creates a new token for the particular event and pushes the new token into the output channel.

Thus, illustrative embodiments provide a computer implemented method, system, and computer usable program code for providing correct output consistency for continuous queries with processing structures that are directed acyclic graphs. The invention may take the form of an entirely hardware embodiment, an entirely software embodiment, or an embodiment containing both hardware and software elements. In a preferred embodiment, the invention is implemented in software, which includes but is not limited to firmware, resident software, microcode, etc.

Furthermore, the invention may take the form of a computer program product accessible from a computer-usable or computer-readable medium providing program code for use by or in connection with a computer or any instruction execution system. For the purposes of this description, a computer-usable or computer-readable medium may be any tangible apparatus that may contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk—read only memory (CD-ROM), compact disk—read/write (CD-R/W), and DVD.

Further, a computer storage medium may contain or store a computer readable program code such that when the computer readable program code is executed on a computer, the execution of this computer readable program code causes the computer to transmit another computer readable program code over a communications link. This communications link may use a medium that is, for example without limitation, physical or wireless.

A data processing system suitable for storing and/or executing program code will include at least one processor coupled directly or indirectly to memory elements through a system bus. The memory elements may include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for providing consistency guarantees in a data stream processing engine, the computer implemented method comprising:
    attaching consistency tracking information that includes synchronization tokens to data streams coming into the data stream processing engine;
    propagating the consistency tracking information through a plurality of streaming operators that process the data streams within the data stream processing engine to form propagated consistency tracking information;
    responsive to an operator within the plurality of streaming operators receiving an event from an inbound data stream, determining whether the event is a synchronization token;
    responsive to determining that the event is a synchronization token, determining whether a set of synchronization tokens is complete, wherein the set of synchronization tokens includes the synchronization token and a corresponding synchronization token from each other inbound data stream to the operator;
    responsive to determining that the set of synchronization tokens is complete, creating a new synchronization token;
    pushing the new synchronization token into an output queue, wherein a presence of the new synchronization token within the output queue represents a consistent output state for all preceding processed events by the operator; and
    using the propagated consistency tracking information to detect a consistent state in an output stream.

2. The computer implemented method of claim 1, wherein the synchronization tokens are inserted at predetermined time intervals into the data streams coming into the data stream processing engine.

3. The computer implemented method of claim 2, wherein a frequency of inserting the synchronization tokens into the data streams coming into the data stream processing engine is modified at runtime to achieve optimal system performance.

4. The computer implemented method of claim 1, wherein the consistent state in the output stream occurs after each streaming operator within the plurality of streaming operators.

5. The computer implemented method of claim 1, wherein the synchronization tokens provide snapshots of a system without halting execution of events, and wherein the snapshots are used to recover the system from a failure.

6. The computer implemented method of claim 1, wherein the consistency tracking information includes event labels.

7. The computer implemented method of claim 6, wherein the event labels are attached to each of the data streams coming into the data stream processing engine, and wherein each of the data streams has a unique event label attached to it.

8. The computer implemented method of claim 6, further comprising:
    responsive to collecting a list of labels for a pending set of events, selecting a label in the list to form a selected label;
    determining whether the selected label has at least one active ancestor within any queue of a system for a same data stream;
    responsive to determining that the selected label has at least one active ancestor within any queue of the system for the same data stream, determining whether the list of labels is empty, wherein an empty list of labels for the pending set of events represents a consistent state pending set of events; and
    responsive to determining that the list of labels is empty, pushing the consistent state pending set of events onto an output channel.

9. The computer implemented method of claim 6, further comprising:
    responsive to an operator receiving an event from an inbound data stream, determining whether the operator is an emit operator;
    responsive to determining that the operator is an emit operator, creating an identification for the event;
    creating a label for the event, wherein the label includes the identification in a proper processing position for the event;

marking the label for the event as active; and
pushing the event onto an output channel.

10. The computer implemented method of claim 9, further comprising:
responsive to determining that the operator is not an emit operator, processing the event to produce a result;
selecting an event in the result to form a selected result event;
updating the label of the selected result event;
marking the label of the selected result event as active; and
pushing the selected result event onto the output channel.

11. The computer implemented method of claim 1, wherein each of the streaming operators within the plurality of streaming operators assign a maximum label of participating events and propagate an active label of a triggering event.

12. The computer implemented method of claim 1, wherein the step of using the propagated consistency tracking information to detect the consistent state in the output stream further comprises:
examining event labels in the output stream to ensure that no other events with a same active label are produced.

13. The computer implemented method of claim 1, wherein the consistent state in the output stream occurs after a final output streaming operator within the plurality of streaming operators.

14. A data processing system for providing consistency guarantees in a data stream processing engine, comprising:
a bus system;
a storage device connected to the bus system, wherein the storage device stores a set of instructions; and
a processing unit connected to the bus system, wherein the processing unit executes the set of instructions to attach consistency tracking information that includes synchronization tokens to data streams coming into the data stream processing engine; propagate the consistency tracking information through a plurality of streaming operators that process the data streams within the data stream processing engine to form propagated consistency tracking information; determine whether an event is a synchronization token in response to an operator within the plurality of streaming operators receiving the event from an inbound data stream; determine whether a set of synchronization tokens is complete in response to determining that the event is a synchronization token, wherein the set of synchronization tokens includes the synchronization token and a corresponding synchronization token from each other inbound data stream to the operator; create a new synchronization token in response to determining that the set of synchronization tokens is complete; push the new synchronization token into an output queue, wherein a presence of the new synchronization token within the output queue represents a consistent output state for all preceding processed events by the operator; and use the propagated consistency tracking information to detect a consistent state in an output stream.

15. A computer program product stored on a computer readable storage device having computer usable program code embodied thereon that is executable by a computer for providing consistency guarantees in a data stream processing engine, the computer program product comprising:
computer usable program code for attaching consistency tracking information that includes synchronization tokens to data streams coming into the data stream processing engine;
computer usable program code for propagating the consistency tracking information through a plurality of streaming operators that process the data streams within the data stream processing engine to form propagated consistency tracking information;
computer usable program code for determining whether an event is a synchronization token in response to an operator within the plurality of streaming operators receiving the event from an inbound data stream;
computer usable program code for determining whether a set of synchronization tokens is complete in response to determining that the event is a synchronization token, wherein the set of synchronization tokens includes the synchronization token and a corresponding synchronization token from each other inbound data stream to the operator;
computer usable program code for creating a new synchronization token in response to determining that the set of synchronization tokens is complete; push the new synchronization token into an output queue, wherein a presence of the new synchronization token within the output queue represents a consistent output state for all preceding processed events by the operator; and
computer usable program code for using the propagated consistency tracking information to detect a consistent state in an output stream.

16. The computer program product of claim 15, wherein the synchronization tokens are used to provide snapshots of a system without halting execution of events, and wherein the snapshots are used to recover the system from a failure.

17. The computer program product of claim 15, wherein the consistency tracking information includes event labels.

18. The computer program product of claim 17, wherein the event labels are attached to each of the data streams coming into the data stream processing engine, and wherein each of the data streams has a unique event label attached to it.

19. The computer program product of claim 17, further comprising:
responsive to collecting a list of labels for a pending set of events, selecting a label in the list to form a selected label;
determining whether the selected label has at least one active ancestor within any queue of a system for a same data stream;
responsive to determining that the selected label has at least one active ancestor within any queue of the system for the same data stream, determining whether the list of labels is empty, wherein an empty list of labels for the pending set of events represents a consistent state pending set of events; and
responsive to determining that the list of labels is empty, pushing the consistent state pending set of events onto an output channel.

20. The computer program product of claim 17, further comprising:
responsive to an operator receiving an event from an inbound data stream, determining whether the operator is an emit operator;
responsive to determining that the operator is an emit operator, creating an identification for the event;
creating a label for the event, wherein the label includes the identification in a proper processing position for the event;
marking the label for the event as active; and
pushing the event onto an output channel.

* * * * *